United States Patent [19]

Reh

[11] Patent Number: 4,651,063
[45] Date of Patent: Mar. 17, 1987

[54] HORIZONTAL DEFLECTION CIRCUIT

[75] Inventor: Klaus Reh, Albershausen, Fed. Rep. of Germany

[73] Assignee: Standard Elektrik Lorenz AG, Stuttgart, Fed. Rep. of Germany

[21] Appl. No.: 837,545

[22] Filed: Mar. 7, 1986

[30] Foreign Application Priority Data

Mar. 21, 1985 [DE] Fed. Rep. of Germany ....... 3510138

[51] Int. Cl.$^4$ .................. H01Q 3/22; H01Q 3/24; H01Q 3/26
[52] U.S. Cl. .................................................. 315/371
[58] Field of Search ................................ 315/370, 371

[56] References Cited

U.S. PATENT DOCUMENTS 4,206,388  6/1980  Ishigaki et al. ..................... 315/371
4,298,829 11/1981  Luz ..................................... 315/371

Primary Examiner—Theodore M. Blum
Attorney, Agent, or Firm—Donald J. Lenkszus

[57] ABSTRACT

A horizontal deflection circuit is disclosed in which the junction point between a bidirectional switch, a trace capacitor, and a retrace capacitor is grounded through a transistor. The latter is controlled by a control voltage for picture-width stabilization and pincushion correction. It may be shunted by a capacitor and a biased diode.

5 Claims, 1 Drawing Figure

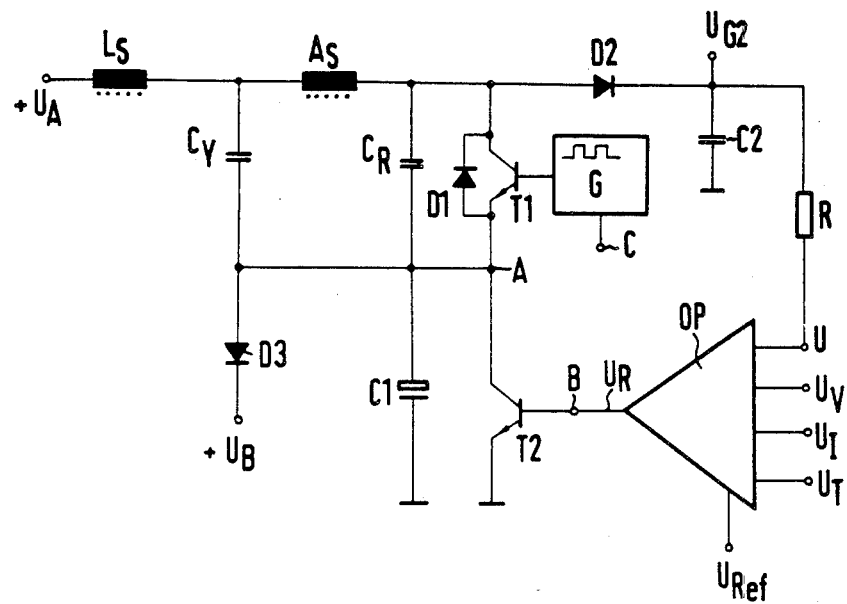

HORIZONTAL DEFLECTION CIRCUIT

BACKGROUND OF THE INVENTION

The invention pertains to a horizontal deflection circuit.

A deflection circuit with pincushion correction for cathode-ray tubes is disclosed in German Pat. No. 31 26 791. A second voltage source is temporarily coupled to the sweep generator of the deflection circuit, which provides pincushion correction. This coupling is controllable, and the control is accomplished via a pulse-width modulator that is influenced by a vertical-frequency voltage. This is to compensate for horizontal pincushion distortion.

SUMMARY OF THE INVENTION

The object of the invention is to provide a horizontal deflection circuit of the above kind which is simpler in design.

BRIEF DESCRIPTION OF THE DRAWING

An embodiment of the invention will now be explained with reference to the accompanying drawing, which is a schematic diagram of a horizontal deflection circuit.

DETAILED DESCRIPTION

The retrace capacitor $C_R$ and the bidirectional switch, consisting of an NPN transistor T1 and a diode D1, are connected in parallel with the series combination of the deflection coil AS and the trace capacitor $C_Y$. Connected to the junction point between the deflection coil AS and the trace capacitor $C_Y$ is a charging coil LS, whose other terminal is connected to the positive supply voltage $+U_A$. The base of the transistor T1 is connected to an oscillator G which generates a horizontal-frequency voltage. This horizontal frequency voltage is synchronized by means of a sync voltage applied at the terminal C.

The junction point between the trace capacitor $C_Y$, the retrace capacitor $C_R$, and the bidirectional switch will be called the "low end", A. This low end A is grounded through an NPN transistor T2. It is also grounded through a capacitor C1, whose DC voltage level is influenced by the transistor T2. To this end, the base of the transistor T2 is connected to the output B of a control amplifier OP. The control voltage $U_R$ provided by the control amplifier OP controls the transistor T2 in such a way that the desired pincushion correction and picture width are achieved.

To produce the control voltage $U_R$, the following voltages are applied to the control amplifier OP:

the reference voltage $U_{Ref}$,
a direct voltage U derived from the retrace pulses,
a vertical-frequency voltage $U_V$,
a voltage $U_I$ corresponding to the beam current of the cathode-ray tube, and
a voltage $U_T$ depending on the operating voltage of the sound stage.

The vertical-frequency voltage $U_V$ is applied to the control amplifier OP in order to compensate for horizontal pincushion distortion as usual. Changes in picture width due to beam-current variations are avoided by applying the voltage $U_I$. In high-power sound stages, volume peaks may load the source of the supply voltage $+U_A$ such that a change in picture width results. Therefore, the voltage $U_T$, which counteracts such changes, is applied to the control amplifier.

The derivation of the voltages $U_V$, $U_I$, and $U_T$ is not shown. The generation of the voltage U will now be described.

Connected to the junction point between the deflection coil AS and the retrace capacitor $C_R$ is the anode of the diode D2, whose cathode is connected to a grounded capacitor C2. With the diode D2 and the capacitor C2, a direct voltage is derived from the retrace pulses that are present at the deflection coil AS. This direct voltage, on the one hand, serves as the voltage $U_{G2}$ for the second grid of the cathode-ray tube and, on the other hand, is applied as a voltage U through the resistor R to the control amplifier OP. The height of the retrace pulses at the deflection coil As corresponds to the width of the picture on the screen of the cathode-ray tube. Accordingly, the voltage U applied to the control amplifier OP is the actual value of the picture width, and the control voltage $U_R$ is derived in the control amplifier by comparing the voltage U with the reference voltage $U_{Ref}$. Thus, a closed-loop control system is provided for picture-width stabilization. The other voltages applied to the control amplifier OP, i.e., the voltages $U_V$, $U_I$, and $U_T$, control the horizontal deflection in such a way that the picture width is maintained constant.

To permit the use of a simple transistor type for the transistor T2, the low end A is connected to the anode of a diode D3 having its cathode connected to a positive voltage $+U_B$. This positive voltage $+U_R$ may be 17 volts, for example. If, due to a fault in the oscillator G or in the components connected to the low end A, the voltage at the low end A rises above the positive voltage at the cathode of the diode D3 plus the forward voltage of the diode D3, the latter will turn on, thus protecting the transistor T2 and the capacitor C1 from excessive voltage.

What is claimed is:

1. A horizontal deflection circuit with pincushion correction for a cathode-ray tube comprising:
    a series combination of a deflection coil and a trace capacitor;
    a retrace capacitor in parallel with said series combination;
    a bidirectional switch in series with said series combination;
    an oscillator controlling said bidirectional switch;
    said series combination, said retrace capacitor and said bidirectional switch being connected to a common node;
    a transistor operable to couple said common node and ground, said transistor being controlled by a control voltage for picture-width stabilization and pincushion correction; and
    a control amplifier having at least one input coupled to said retrace capacitor for receiving a direct voltage derived from the retrace pulses and for providing said control voltage responsive to said direct voltage.

2. A horizontal deflection circuit in accordance with claim 1, comprising:
    a first capacitor connected in parallel with said transistor.

3. A horizontal deflection circuit in accordance with claim 2, comprising:
    a diode having its anode connected to said common node and its cathode connected to a first voltage.

4. A horizontal deflection circuit in accordance with claim 1, wherein:

said control amplifier has additional inputs to which a reference voltage and further voltages for pincushion correction are applied and an output connected to the control input of said transistor.

5. A horizontal deflection circuit in accordance with claim 4, wherein:

said further voltages applied to said control amplifier are a vertical-frequency voltage, a voltage corresponding to the beam current of said cathode-ray tube, and a voltage depending on the operating voltage of a sound stage.

* * * * *